United States Patent [19]

Scherzer

[11] 3,997,239
[45] Dec. 14, 1976

[54] MICROSCOPE WITH BODY TUBE FORMED OF COMPLEMENTAL SHELL HALVES

[75] Inventor: Erwin Scherzer, Nuremberg, Germany

[73] Assignee: C. Proebster Jr. Nachfolger, Nuremberg, Germany

[22] Filed: Apr. 21, 1975

[21] Appl. No.: 569,591

[30] Foreign Application Priority Data

Apr. 25, 1974 Germany .......................... 2419966

[52] U.S. Cl. .................................... 350/84; 350/39
[51] Int. Cl.² ......................................... G02B 21/24
[58] Field of Search ............. 350/39, 37, 254, 257, 350/252, 69, 84, 8, 70

[56] References Cited

UNITED STATES PATENTS 2,696,755  12/1954  Frischmann ......................... 350/39
2,720,138  10/1955  Michel et al. ....................... 350/39
3,565,512  2/1971  Deck ................................... 350/39

Primary Examiner—John K. Corbin
Assistant Examiner—Jon W. Henry
Attorney, Agent, or Firm—Spencer & Kaye

[57] ABSTRACT

A microscope has an arm; a body tube secured to the arm and constituted by a plurality of longitudinally joining shell parts; a stage supported by the arm; a mechanism for moving the body tube relative to the stage along the optical axis of the microscope; an ocular mounted in the body tube; an objective turret carrying a plurality of objectives and supported by the body tube eccentrically with respect to the optical axis; and a mechanism for rotating the objective turret for aligning a selected one of the objectives with the optical axis.

14 Claims, 5 Drawing Figures

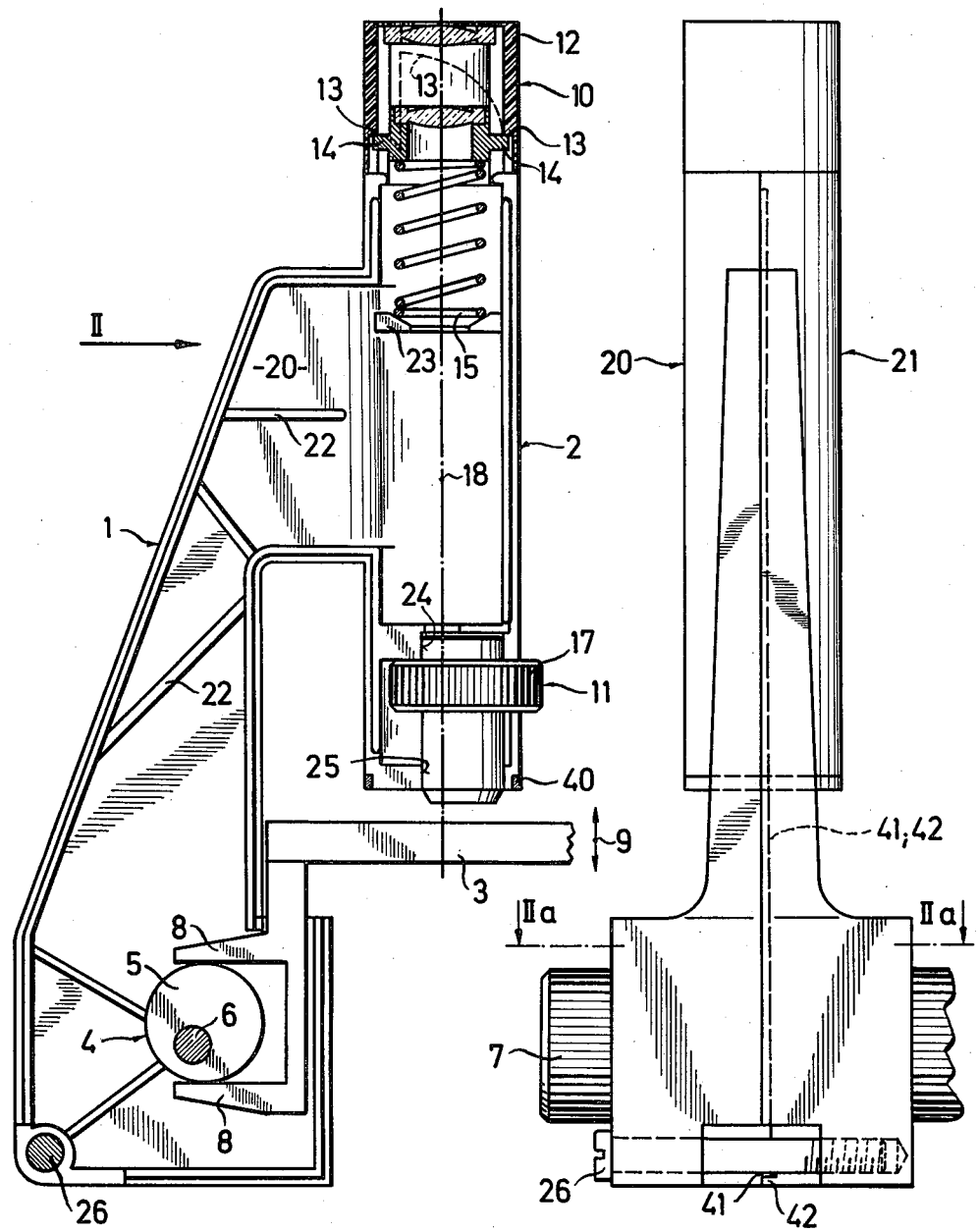

MICROSCOPE WITH BODY TUBE FORMED OF COMPLEMENTAL SHELL HALVES

BACKGROUND OF THE INVENTION

This invention relates to a microscope, particularly for educational purposes, including an arm, a body tube and a stage. The body tube and the stage may be adjusted with respect to one another. In the body tube there is disposed an ocular and an objective turret which is provided with a knurled setting ring and which is held eccentrically with respect to the optical axis of the body tube.

A microscope of the afore-outlined type is known and is disclosed, for example, in German Utility Model No. 1,974,899. In the microscope disclosed therein the objective turret is supported in a particular support bearing which is disposed in such a manner that the turret may be rotated eccentrically with respect to the optical axis. Such rotation may be effected with ease by means of an externally arranged knurled ring, whereby each objective mounted in the turret may selectively be brought into the work position, that is, into alignment with the optical axis of the microscope. For immobilizing the turret in the direction of the optical axis, there is provided a sphere which projects into a circumferential groove under spring bias.

Microscopes of the above-outlined type have numerous advantages. They have, however, the disadvantage that they are difficult to assemble, particularly because the eccentrically supported components have to be inserted into the arm or, as the case may be, into the body tube separately and in succession, and can only subsequently be secured by screws to one another.

SUMMARY OF THE INVENTION

It is an object of the invention to provide an improved microscope of the above-outlined type which is of simplified structure and which may be more easily assembled.

This object and others to become apparent as the specification progresses, are accomplished by the invention, according to which briefly stated, the body tube of the microscope and, occasionally, also the microscope arm, are designed as multishell structures, wherein the shell parts join one another in the longitudinal direction. Body tube and arm are mentioned separately here because it is feasible — according to prior art practice — to manufacture these two components separately and secure them to one another only subsequently. It is, however, within the scope of the invention to make these two parts as a single, integral component for simplifying the construction of the entire microscope. The necessary relative adjustment between the objective and the stage may be effected either by moving the stage by means of a proper drive, for example, an eccentric drive and the arm-tube unit is connected to a fixed leg or, conversely, the stage is connected with the microscope leg and the arm-tube unit is adjustable by a drive means.

It is particularly advantageous to design the tube and, occasionally, also the arm as a two-shell component. The shell halves are coupled to one another by a mating rib-and-shoulder fit and, subsequent to assembly and fitting, they may be rigidly connected to one another. Such rigid connection may be effected by structural components which are, in any event, part of the microscope, such as knurled knobs, drive shafts, eyepieces or the like, or also, by means of additional screws. Further, it is also feasible to interconnect the shells by bonding, such as by gluing, soldering or welding. The overall structure of the microscope, the microscope material, particularly the material of the arm and the body tube, determine which one of the above-outlined methods are the best adapted for any particular microscope type. According to the prior art, microscopes are generally made of metal, for example, brass. More recently, injection-molded light metal has been used. The microscope according to the invention too, may be made of a metal or a synthetic material. For more simple microscopes a synthetic material is preferred over metal.

The multi-shell structure, particularly a two-shell structure, has the advantage that the usual required components, such as the objective turret, including the objectives and the knurled ring, the adjusting drive or the ocular may be prepared as complete structural units and may be inserted as such into the arm or the body tube. In particular, for the objective turret, there is provided a support bearing which is formed as part of the shells and in which the turret unit is inserted during the assembly of the microscope. It has been found to be particularly advantageous to position the objective turret in the support bearing with a three-point support engaging the circumference of the turret, wherein two supports, for example, in the form of projections, are arranged in the one shell half, whereas the third support is constituted by a spring and is disposed in the other shell half. The objective turret may have longitudinal grooves which in number are identical to that of the objectives. Further, the spring may have a lug which is adapted to fit into the grooves. The spring, with its lug is oriented in such a manner that the objective turret is locked each time an objective arrives into the work position.

The multi-shell structure (particularly the two-shell structure) according to the invention offers, furthermore, significant manufacturing advantages regarding the individual components. Thus, for example, it is possible to make the individual shells by means of injection molding or stamping and to provide, at the inside, particularly in the arm, reinforcing ribs or the like. In this manner it is possible to make the entire microscope of synthetic material without going outside the tolerances, particularly those relating to bending stress. This mode of manufacture further offers the possibility to make the required support bearing as well as the projections for the above-noted three-point support for the objective turret simultaneously with the manufacture of the arm or the body tube, whereby the entire manufacturing process is significantly simplified.

BRIEF DESCRIPTION OF THE DRAWINGS

FIG. 1 is a schematic side elevational sectional view of a microscope incorporating a preferred embodiment of the invention.

FIG. 2 is a rear elevational view of the same embodiment, taken in the direction of arrow II of FIG. 1.

FIG. 2a is a sectional view of the joint between two shell halves, taken along line IIa—IIa of FIG. 2.

DESCRIPTION OF THE PREFERRED EMBODIMENT

Figure 3:
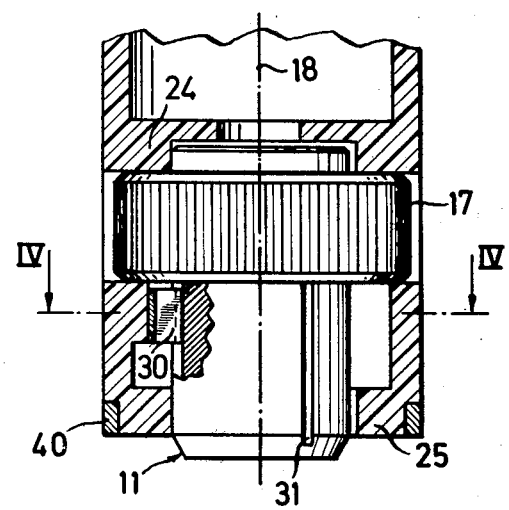
FIG. 3 is a sectional view taken along line III—III of FIG. 4, on an enlarged scale, of the lower part of the body tube of the microscope including the objective turret.

Turning first to FIG. 1, the microscope illustrated therein has an arm 1, a body tube 2 integral with the arm 1 and a stage 3. The body tube 2 and the stage 3 are relatively adjustable with respect to one another which, in the embodiment illustrated, is accomplished by rendering the stage 3 adjustable by means of an eccentric drive generally designated at 4. The latter comprises an eccentric disc 5 which is keyed to a shaft 6. The shaft 6 projects outwardly and carries, on both sides, a knurled knob 7 by means of which it may be rotated with ease. The circumference of the eccentric disc 5 is engaged by two diametrically oppositely located projections 8 which straddle the eccentric disc 5 in a fork-like manner. These projections are rigidly connected with the stage 3 so that, when the eccentric disc 5 is rotated by means of the knurled knob 7, the projections 8 as well as the stage 3 will be displaced vertically in the direction of the double-headed arrow 9.

In the body tube 2 there is disposed an ocular 10 and an objective turret 11. The ocular 10 is expediently a zoom-type ocular which may be adjusted by means of a rotatable eyepiece 12 which, for this purpose, has an internal thread 13 engaged by projections 14 of the adjustable components of the zoom ocular. The projections 14 are, for the purpose of avoiding any play, urged against the thread 13 by a coil spring 15.

In the lower part of the body tube 2 there is situated the objective turret 11. The latter is inserted into a support bearing 24, 25 and is, by means of a knurled ring 17 which projects forwardly from the body tube 2, adjustable eccentrically with respect to the optical axis 18. In this manner it is possible to bring a selected one of the objectives 19 (FIG. 4) in the work position, that is, into alignment with the optical axis 18 of the microscope.

As it may be observed in FIG. 2, both the arm 1 and the body tube 2 are of a multi-shell structure, more particularly, in the embodiment illustrated, of a two-shell structure. The shells are designated with reference numerals 20 and 21. They are, as seen in FIG. 2a, in engagement with one another in the longitudinal direction by means of a mating rib-and-shoulder joint 41, 42.

The shells 20 and 21 have internal reinforcing ribs 22 which contribute significantly to the mechanical stability of the microscope. Further, they have internal, integral projections 23 for the coil spring 15 of the ocular 10. They also include the support bearing 24, 25 for the objective turret 11.

The assembly of the microscope is significantly facilitated by virtue of the invention. The components which are to be inserted in the arm or, as the case may be, in the body tube, such as the eccentric drive 4, the ocular 10 as well as the objective turret 11, are manufactured as separate structural units and are placed into one of the shells 20 or 21. Thereafter, the other shell is put in place and the two shells are connected with one another. Such an interconnection may be effected without j difficulty by means of otherwise present components, such as the shaft 6 or the adjusting knobs 7 as well as the eyepiece 12 and the brace ring 40. Or, there may be provided separate screws 26 (FIG. 1) which are inserted preferably in easily accessible locations. It is further feasible to secure the shells to one another by means of gluing or, in case the shells are made of a metal, by means of soldering or welding.

Figure 4:
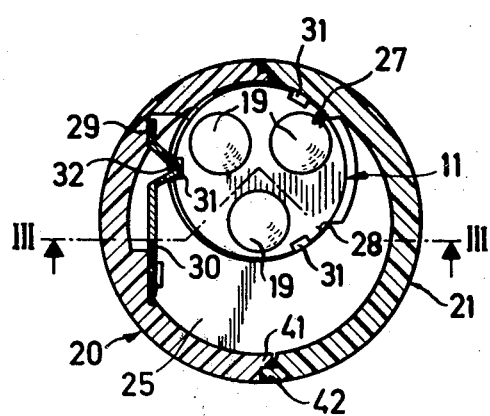
FIG. 4 is a sectional view taken along lines IV—IV of FIG. 3.

Turning now to FIG. 3, it is seen that the objective turret 11 forms, together with the knurled ring 17 a structural unit which is inserted into the support bearing 24, 25 which, in turn, is formed as part of the shells 20, 21. In order to ensure, even during adjustment, a clearance-free seating of the objective turret, the latter is held in the support bearing 24, 25 by means of a three-point support engaging its circumference. Two of the supports designated at 27 and 28 in FIG. 4 are in the shape of projections which are part of the shell 21, whereas the third support 29 is a spring 30 which is inserted into the other shell 20. The spring 30 thus firmly presses the objective turret 11 against the two supports 27 and 28, so that their seat is maintained even during switching from one objective to another and therefore the image will not wobble during this manipulation: In the example illustrated, the spring 30 is a leaf spring which engages shoulder-like portions of the sheel 20. Instead of the leaf spring, there may be used a coil spring which, with the aid of a ball, engages into the circumferential groove provided in the objective turret.

The illustrated embodiment of the three-point support is further used for a locking of the objective turret which occurs each time an objective 19 is in the work position. For this purpose, the objective turret 11 has longitudinal grooves 31 which are oriented parallel to the optical axis 18 and which in number are identical to the number of objectives. On the spring 30 there is arranged a lug 32. The spring-and-lug unit is so disposed that it is in alignment, that is, it will be in a snap-in state, with respect to a groove 31 when an objective 19 arrives into and is in alignment with the work position.

It will be understood that the above description of the present invention is susceptible to various modifications, changes and adaptations, and the same are intended to be comprehended within the meaning and range of equivalents of the appended claims.

What is claimed is:

1. In a microscope having an arm; a body tube secured to the arm and having a length dimension; a stage supported by the arm; a mechanism for effecting relative movement between the body tube and the stage along the optical axis of the microscope; an ocular mounted in the body tube; an objective turret carrying a plurality of objectives and supported by the body tube eccentrically with respect to the optical axis; and a mechanism for rotating the objective turret for aligning a selected one of the objectives with the optical axis; the improvement wherein the body tube is constituted by two complemental shell halves adjoining one another along a direction that is substantially parallel to said length dimension.

2. A microscope as defined in claim 1, wherein said arm has a length dimension and is constituted by two complemental shell halves adjoining one another along a direction that is substantially parallel to the length dimension of said arm.

3. A microscope as defined in claim 2, wherein each body tube shell half forms an integral, one-piece part with the one and the other arm shell half.

4. A microscope as defined in claim 1, wherein said shell halves are joined to one another with a mating rib-and-shoulder fit.

5. A microscope as defined in claim 1, further comprising reinforcing ribs integral with said shell halves and arranged in the inside of said body tube.

6. A microscope as defined in claim 1, including means for holding together said shell halves.

7. A microscope as defined in claim 6, wherein said means includes a microscope component passing through said shell halves.

8. A microscope as defined in claim 6, wherein said means include tightening screws.

9. A microscope as defined in claim 6, wherein said means includes a welded bond.

10. A microscope as defined in claim 6, wherein said means includes a glued bond.

11. A microscope as defined in claim 6, wherein said means includes a soldered bond.

12. A microscope as defined in claim 1, further comprising a support bearing formed on said shell halves and arranged in the inside of said body tube, said turret being held in said body tube by said support bearing.

13. In a microscope having an arm; a body tube secured to the arm and having a length dimension; a stage supported by the arm; a mechanism for effecting relative movement between the body tube and the stage along the optical axis of the microscope; an ocular mounted in the body tube; an objective turret carrying a plurality of objectives and supported by the body tube eccentrically with respect to the optical axis; and a mechanism for rotating the objective turret for aligning a selected one of the objectives with the optical axis; the improvement wherein the body tube is constituted by two complemental shell halves adjoining one another along a direction that is substantially parallel to said length dimension; the improvement further comprising a support bearing formed on said shell halves and arranged in the inside of said body tube for holding said turret in said body tube; said support bearing forming a three-point support engaging said turret, two support points of said three-point support being constituted by projections forming part of one shell half; one support point of said three-point support being constituted by a spring held in the other shell half.

14. A microscope as defined in claim 13, further including means forming a plurality of circumferentially spaced grooves in said objective turret, said grooves being oriented parallel to the optical axis and being identical in number to that of said objectives; and a lug provided on said spring; said lug being aligned with and snapping into a groove when any of said objective is in alignment with the optical axis.

* * * * *